United States Patent
Shigeura et al.

[11] Patent Number: 5,537,889
[45] Date of Patent: Jul. 23, 1996

[54] GEAR DEVICE HAVING TOOTH PROFILE IMPROVED IN REDUCING LOCAL FRICTIONAL HEAT VALUE AND METHOD OF PRODUCING SUCH A GEAR DEVICE

[75] Inventors: Junichi Shigeura, Amagasaki; Aizoh Kubo, Kyoto, both of Japan

[73] Assignees: Mitsubishi Denki Kabushiki Kaisha, Tokyo; Aizoh Kubo, Kyoto, both of Japan

[21] Appl. No.: 348,828

[22] Filed: Nov. 29, 1994

[30] Foreign Application Priority Data

Nov. 30, 1993 [JP] Japan .................................. 5-300030

[51] Int. Cl.$^6$ .................................................. F16H 1/24
[52] U.S. Cl. .............................. 74/464; 74/462
[58] Field of Search ........................ 74/457, 460, 462, 74/464

[56] References Cited

U.S. PATENT DOCUMENTS

| | | | |
|---|---|---|---|
| 1,701,222 | 2/1929 | Belati | 74/462 |
| 2,422,326 | 6/1947 | Wildhaber | 74/462 |
| 2,436,276 | 2/1948 | Wildhaber | 74/462 |
| 3,438,279 | 4/1969 | Rouverol . | |
| 4,640,149 | 2/1987 | Drago . | |
| 4,651,588 | 3/1987 | Rouverol | 74/462 |
| 5,315,790 | 5/1994 | Kish et al. | 74/462 |

OTHER PUBLICATIONS

ISO/TC 60/SC 3/WG 12, "CALCULATION OF THERMAL LOAD CAPACITY OF CYLINDRICAL, BEVEL AND HYPOID GEARS" Doc N 6, Part 1: Evaluating the Risk of Scuffing, pp. 1–54 and Doc N 7, Part 2: Evaluating the Bulk Temperature Distribution, pp. 1–34.

"MACHINE DESIGN HANDBOOK", Kyoritu Shuppan, 1955, Apr. 25, pp. 10–1 to 10–57.

Engineering Materials and Design, vol. 20, No. 2, Feb. 1976, pp. 25–31, W. S. Rouverol, "SELECTIVE PERFORMANCE GEARING".

Antriebstechnik, vol. 15, No. 6, Jun. 1975, pp. 324–329, J. Hlebanja, "KONKAV–KONVEXE VERZAHNUNG ERMITTLUNG DER ZAHNFLANKEN UND EINIGE GRENZFALLE".

Gear Technology, No. 6, Nov./Dec. 1988, S. M. Vijayakar, et al., "GEAR TOOTH PROFILE DETERMINATION FROM ARBITRARY RACK GEOMETRY", pp. 18–30.

*Primary Examiner*—Rodney H. Bonck
*Assistant Examiner*—David Fenstermacher
*Attorney, Agent, or Firm*—Oblon, Spivak, McClelland, Maier, & Neustadt

[57] ABSTRACT

A gear device improved in lowering the product of the load F acting on a pair of intermeshing teeth and the relative sliding velocity v at the area of contact of the gears, thereby minimizing the frictional heat. The gear device includes a first gear and a second gear each having a tooth profile formed by an involute curve. At least one of the first and second gears is provided with the tooth profile corrected by a combination of a correction curve W and the involute curve. On plane coordinates consisting of an x axis, an origin and a y axis which intersects with the x axis at the origin, the correction curve W is expressed by equations passing through points $P_1$ $(x_1, y_1)$ and $P_2$ $(x_2, y_2)$ and satisfying the conditions of: y=0, dy/dx=0 at the origin when $x_1 < x_2$ and $y_1 < y_2$. The x axis is the line of action indicative of a locus along which an intermeshing point moves while the first gear transmits a force to the second gear. The origin is a point at which the x axis intersects with an intermeshing pitch circle of the first and second gears.

18 Claims, 14 Drawing Sheets

GEAR DEVICE HAVING TOOTH PROFILE IMPROVED IN REDUCING LOCAL FRICTIONAL HEAT VALUE AND METHOD OF PRODUCING SUCH A GEAR DEVICE

BACKGROUND OF THE INVENTION

1. Field of the Invention

The present invention generally relates to a gear device and a method of producing such a gear device. More particularly, the invention relates to a gear device which rotates while transferring power from a first gear to a second gear and which has a tooth profile improved in reducing the local frictional heat value. The invention also relates to a method of producing such a gear device.

2. Description of the Related Art

FIGS. 19 and 20 illustrate the configuration obtained by performing two types of the tooth-profile correction on a conventional gear. Portion $\underline{a}$ indicates a rack-like shape obtained by developing an involute curve for forming the tooth profile of the gear into a straight line. Portion $\underline{b}$ indicates the configuration obtained by performing the tooth-profile correction over a range of portions $\underline{g}$ and $\underline{h}$. The values $\underline{g}$ and $\underline{h}$ are described in general literature of this technical field (which literature is exemplified in the portion marked with "*"; hereinafter). The portions filled in with black indicate those which have been shaved (hereinafter, such portions mean the same). In other words, the outer line including such portions indicates the rack-like shape obtained by developing the involute curve into a straight line, while the inner line excluding such portions indicates the configuration of the tooth profile which has been corrected. The inner line of portion $\underline{b}$ in FIG. 19 is indicated by a straight line, while that in FIG. 20 is indicated by a circular arc having radius $\underline{r}$.

*: (1) ISO/TC 60/SC 3/WG 12 Doc N 6

A pair of gears formed in the shape as described above are intermeshed with each other as illustrated in FIG. 21. For transmitting a torque of a gear 1 to a gear 2, the tooth intermeshing starts at point P on the line of action C (length of intermeshing) and ends at point R via points O and Q. FIG. 21 shows a pitch circle $d_1$ of the gear 1, a pitch circle $d_2$ of the gear 2, a base circle $e_1$ of the gear 1, a base circle $e_2$ of the gear 2, an addendum circle $f_1$ of the gear 1, an addendum circle $f_2$ of the gear 2, and pitch point O at which the relative sliding velocity at the tooth surface becomes zero.

The states of intermeshing the gears 1 and 2 from starting point P to end point R will now be explained with reference to FIGS. 22A–22E.

FIG. 22A shows the state in which the gears 1 and 2 are intermeshed at point $Q_{11}$ on the line of action C and at which the intermeshing point $Q_{11}$ moves to the right-hand of FIG. 22A as indicated by the arrow 3.

FIG. 22B shows the state in which the intermeshing point moves from point $Q_{11}$ to point $Q_{12}$, and simultaneously, the teeth adjacent to the line of approach start to intermesh with each other at point $Q_{22}$.

FIG. 22C shows the state in which the intermeshing point adjacent to the line of recess moves from point $Q_{12}$ to point $Q_{13}$ and the intermeshing point adjacent to the line of approach moves from point $Q_{22}$ to point $Q_{23}$, and which the teeth are thus intermeshing with each other at the two points $Q_{13}$ and $Q_{23}$ at the same time.

FIG. 22D shows the state in which the intermeshing point adjacent to the line of approach moves from point $Q_{23}$ to point $Q_{24}$, and simultaneously, the teeth adjacent to the line of recess finish intermeshing at point $Q_{14}$.

FIG. 22E shows the state in which the intermeshing point adjacent to the line of approach moves from point $Q_{24}$ to point $Q_{25}$, that is, the gears are intermeshed only at point $Q_{25}$.

FIG. 21 shows the intermeshing state of the gears 1 and 2 in which the intermeshing point Q moves on the line of action C in the direction indicated by the arrow 3, and then, the gears 1 and 2 start to be intermeshed at point P.

In such a state, the tooth of the gear 1 intermeshed at point Q is bent and deflected on the line of action C in the direction reverse to that indicated by the arrow 3. At the same time, the gear 2 is bent and deflected on the line of action C in the direction indicated by the arrow 3.

In consequence, the distance between points P and Q of the gear 1 is contracted, while that of the gear 2 is stretched, thus causing an abrupt collision between the teeth of the gears 1 and 2 at point P.

In order to alleviate such a collision, the configuration of the addendum portions is corrected, as shown in FIG. 19 or FIG. 20. This correction is designed in order to avoid an abrupt collision at the initial point P of the gear intermeshing so that a load varies smoothly and in order to minimize a change in the rotation angle to be transmitted.

FIG. 23 shows the state of the intermeshing of the conventional gear illustrated in FIG. 21 and indicates the load F acting on teeth starting from starting point P of the gear intermeshing to end point R via point Q on the line of action C, the relative sliding velocity v at the intermeshing surface of contact, and the product F·v of the load F and the sliding velocity v. The load F and the sliding velocity v can be calculated based on the general literature (indicated by "*") of this technical field.

*: (1) ISO/TC 60/SC 3/WG 12 Doc N 6

In FIG. 23, a curve 4 indicative of the load F acting on the teeth (representing the weight kg by the unit of kgf) and consists of an increasing curve $4a$, a straight line $4b$ indicative of the maximum load, and a decreasing curve $4c$. A curve 5 indicates the relative sliding velocity v (by the unit of m/s) at the intermeshing surface of contact and consists of a decreasing curve $5a$ and an increasing curve $5b$ which are bordered by pitch point O. A curve 6 indicates the product F·v of the load F and the relative sliding velocity v and consists of a first curve $6a$ and a second curve $6b$ which are bordered by pitch point O, the curves being formed in a projection-like shape.

As is indicated by the increasing curve $4a$, a sharp increase in the load F acting on the teeth is alleviated by the tooth-profile correction shown in FIG. 19 or FIG. 20. However, as indicated by the straight line $4b$ of FIG. 23, when the maximum load is imposed on the teeth, the product F·v of the load F and the relative sliding velocity v increases as the relative sliding velocity v gradually increases from pitch point O. Even when the intermeshing nearly comes to an end, the decreasing curve $4c$ of the load F decreases gently, and thus, the product F·v takes on an extremely high maximum value, as indicated by the second curve $6b$.

A conventional gear device constructed as described above presents the following problems.

There is an increase in the product F·v of the load F acting on the teeth and the relative sliding velocity v at the area of contact of a pair of teeth, thereby increasing a frictional heat and sometimes resulting in scoring at the tooth surface.

Further, teeth which do not undergo a suitable tooth-profile correction are likely to be deflected by the intermeshing of the gears, which brings about a change in the rotation velocity of a driven gear, thereby inducing torsional vibration.

Calculation of thermal load capacity of cylindrical, bevel and hypoid gears
Part 1:
Evaluating the risk of scuffing Issued on Sep. 27, 1993 pp 1–54

(2) Mechanical Design Handbook Kyoritsu Shuppan Ltd.
Issued on Apr. 25, 1955 pp 10-1–10-56 Gear

SUMMARY OF THE INVENTION

Accordingly, in order to overcome the above drawbacks, an object of the present invention is to calculate a tooth profile employed whereby the product F·v of the load F acting on intermeshing teeth and the relative sliding velocity v can be reduced and the peak value of the frictional heat value can be minimized by correcting the each tooth profile so that at least one of the tooth profile is corrected based on a correction amount obtained by a correction curve and that the combined correction amount of the first and second gears becomes to be equal to the correction amount obtained by the correction curve.

Another object of the present invention is to provide a gear device which reduces the product F·v of the load F acting on intermeshing teeth and the relative sliding velocity v of intermeshing gears so as to minimize the peak value of the frictional heat, and which minimizes a change in the rotation velocity so as to suppress torsional vibration.

A still another object of the present invention is to provide a method of producing a gear device based on a calculation of a tooth profile whereby the product F·v of the load F acting on intermeshing teeth and the relative sliding velocity v of intermeshing gears can be reduced and the peak value of the frictional heat value can be minimized by machining each tooth profile so that at least one of the tooth profile is corrected based on a correction amount obtained by a correction curve and that combined correction amount of the first and second gears becomes to be equal to the correction amount obtained by the correction curve.

A further object of the present invention is to provide a method of producing a gear device which reduces the product F·v of the load F acting on intermeshing teeth and the relative sliding velocity v of intermeshing gears so as to minimize the peak value of the frictional heat, and which minimizes a change in the rotation velocity so as to suppress torsional vibration.

Other objects, advantages and novel features will partially become apparent from the following description and will partially become manifest to those skilled in the art by examining the following description or by carrying out the present invention.

In order to achieve the above objects, according to one aspect of the present invention, there is provided a gear device comprising a first gear and a second gear each having a tooth profile formed by an involute curve, each tooth profile being formed so that at least one of the tooth profile is corrected based on a correction amount obtained by a correction curve and that combined correction amount of the first and second gears becomes to be equal to the correction amount obtained by the correction curve, at least one of the first and second gears being provided with the tooth profile which is corrected by a combination of a correction curve and the involute curve, the correction curve being expressed by the following equation (3) having m determined by the following equation (1) and n determined by the following equation (2) on plane coordinates consisting of an x axis, an origin and a y axis which intersects with the x axis at the origin, the x axis being the line of action indicative of a locus along which an intermeshing point moves while the first gear transmits a force to the second gear, the origin at which the x axis intersects with an intermeshing pitch circle of the first and second gears, equations (1) and (2) passing through points $P_1$ $(x_1, y_1)$ and $P_2$ $(x_2, y_2)$ and satisfying the conditions of: $y=0$, $dy/dx=0$ at the origin when $x_1 < x_2$ and $y_1 < y_2$.

$$m = \frac{y_1}{x_1^n} = \frac{y_2}{x_2^n} \quad (1)$$

$$n = \frac{\log_e \frac{y_2}{y_1}}{\log_e \frac{x_2}{x_1}} \quad (2)$$

$$y = mx^n \quad (3)$$

According to another aspect of the present invention, there is provided a gear device comprising a first gear and a second gear each having a tooth profile formed by an involute curve, at least one of the tooth profile is corrected so as to exist a sixth correction curve, the sixth correction curve being obtained by correction curves comprising: first and second tooth-profile correction curves calculated based on the foregoing equation (3) having m determined by the foregoing equation (1) and n determined by the foregoing equation (2) on plane coordinates consisting of an x axis, an origin and a y axis which intersects with the x axis at the origin, the x axis being the line of action indicative of a locus along which an intermeshing point moves while the first gear transmits a force to the second gear, the origin at which the x axis intersects with an intermeshing pitch circle of the first and second gears, the foregoing equations (1) and (2) passing through points $P_1$ $(x_1, y_1)$ and $P_2$ $(x_2, y_2)$ and satisfying the conditions of: $y=0$, $dy/dx=0$ at the origin when $x_1 < x_2$ and $y_1 < y_2$, the first tooth-profile correction curve being employed whereby the product of a load due to the gear intermeshing and a relative sliding velocity after a point at which a maximum load starts to decrease becomes smaller than the product of the relative sliding velocity and the maximum load at the point, the second tooth-profile correction curve being employed whereby a vibration caused by the gear intermeshing is minimized; the first and second correction curves being depicted on the plane coordinates; a third tooth-profile correction curve indicative of a mean value between the first and second correction curves being depicted; and a fourth tooth-profile correction curve being depicted so that it externally contacts the first correction curve at the broadest spacing between the first and second correction curves and a fifth tooth-profile correction curve being depicted so that it internally contacts the second correction curve, the fourth and fifth correction curves respectively keeping the same spacing constantly with the third correction curve; the sixth correction curve being present between the fourth and fifth correction curves obtained by combining to add the correction amounts of the each gears on the x axis.

According to still another aspect of the present invention, there is provided a gear device having each of the foregoing aspects of the present invention in which an increasing curve of a load acting on intermeshing teeth of the gears may increase upward in a projection-like form (in particular, as shown in the drawing figures, the curve extends upwardly in a convex manner) and a decreasing curve thereof may decrease downward in a projection-like form (i.e., extending in a downwardly convex manner).

According to a further aspect of the present invention, one of increasing and decreasing curves of a load acting on intermeshing teeth of the gears, which curve is adjacent to a higher degree of relative sliding velocity at a tooth surface of contact, may decrease downward in a projection-like form.

According to a further aspect of the present invention, the product of the load due to the gear intermeshing and the relative sliding velocity after a point at which the maximum load starts to decrease may become smaller than the product of the relative sliding velocity and the maximum load at the above-mentioned point.

According to a further aspect of the present invention, there is provided a method of producing a gear device of the type which comprises a first gear and a second gear each having a tooth profile formed by an involute curve, each tooth profile being formed so that at least one of the tooth profile is corrected based on a correction amount obtained by a correction curve and that combined correction amount of the first and second gears becomes to be equal to the correction amount obtained by the correction curve, the correction curve being expressed by the foregoing equation (3) having m determined by the foregoing equation (1) and n determined by the foregoing equation (2) on plane coordinates consisting of an x axis, an origin and a y axis which intersects with the x axis at the origin, the x axis being the line of action indicative of a locus along which an intermeshing point moves while the first gear transmits a force to the second gear, the origin at which the x axis intersects with an intermeshing pitch circle of the first and second gears, the foregoing equations (1) and (2) passing through points $P_1$ ($x_1$, $y_1$) and $P_2$ ($x_2$, $y_2$) and satisfying the conditions of: $y=0$, $dy/dx=0$ at the origin when $x_1<x_2$ and $y_1<y_2$.

According to a further aspect of the present invention, there is provided a method of producing a gear device in which each tooth profile being formed so that at least one of the tooth profile is corrected based on a correction amount obtained by a correction curve and that combined correction amount of the first and second gears becomes to be equal to the correction amount obtained by the correction curve, a correction curve which is calculated so that an increasing curve increases upward and a decreasing curve decreases downward in a projection-like form, the curves indicating a load acting on intermeshing teeth of the gears.

According to a further aspect of the present invention, there is provided a method of producing a gear device in which each tooth profile being formed so that at least one of the tooth profile is corrected based on a correction amount obtained by a correction curve and that combined correction amount of the first and second gears becomes to be equal to the correction amount obtained by the correction curve, wherein a correction curve which is calculated so that one of an increasing curve and a decreasing curve, which curve is adjacent to a higher degree of relative sliding velocity at the tooth surface of contact, decreases downward in a projection-like form, the curves indicating a load acting on intermeshing teeth of the gears.

According to a further aspect of the present invention, there is provided a method of producing a gear device in which each tooth profile being formed so that at least one of the tooth profile is corrected based on a correction amount obtained by a correction curve and that combined correction amount of the first and second gears becomes to be equal to the correction amount obtained by the correction curve, wherein correction curve which is calculated so that the product of a load due to the gear intermeshing and a relative sliding velocity after a point at which a maximum load starts to decrease becomes smaller than the product of the relative sliding velocity and the maximum load at the above-mentioned point.

According to a further aspect of the present invention, there is provided a method of producing a gear device of the type which comprises a first gear and a second gear each having a tooth profile formed by an involute curve, at least one of the tooth profile is corrected so as to exist a sixth correction curve, the sixth correction curve being obtained by correction curves comprising: first and second tooth-profile correction curves calculated based on the foregoing equation (3) having m determined by the foregoing equation (1) and n determined by the foregoing equation (2) on plane coordinates consisting of an x axis, an origin and a y axis which intersects with the x axis at the origin, the x axis being the line of action indicative of a locus along which an intermeshing point moves while the first gear transmits a force to the second gear, the origin at which the x axis intersects with an intermeshing pitch circle of the first and second gears, the foregoing equations (1) and (2) passing through points $P_1$ ($x_1$, $y_1$) and $P_2$ ($x_2$, $y_2$) and satisfying the conditions of: $y=0$, $dy/dx=0$ at the origin when $x_1<x_2$ and $y_1<y_2$, the first tooth-profile correction curve being employed whereby the product of a load due to the gear intermeshing and a relative sliding velocity after a point at which a maximum load starts to decrease becomes smaller than the product of the relative sliding velocity and the maximum load at the point, the second tooth-profile correction curve being employed whereby a vibration caused by the gear intermeshing is minimized; the first and second correction curves being depicted on the plane coordinates; a third tooth-profile correction curve indicative of a mean value between the first and second correction curves being depicted; and a fourth tooth-profile correction curve being depicted so that it externally contacts the first correction curve at the broadest spacing between the first and second correction curves and a fifth tooth-profile correction curve being depicted so that it internally contacts the second correction curve, the fourth and fifth correction curves respectively keeping the same spacing constantly with the third correction curve; the sixth correction curve being present between the fourth and fifth correction curves obtained by combining to add the correction amounts of the each gears on the x axis.

DESCRIPTION OF THE PREFERRED EMBODIMENTS

First Embodiment

Figure 1:
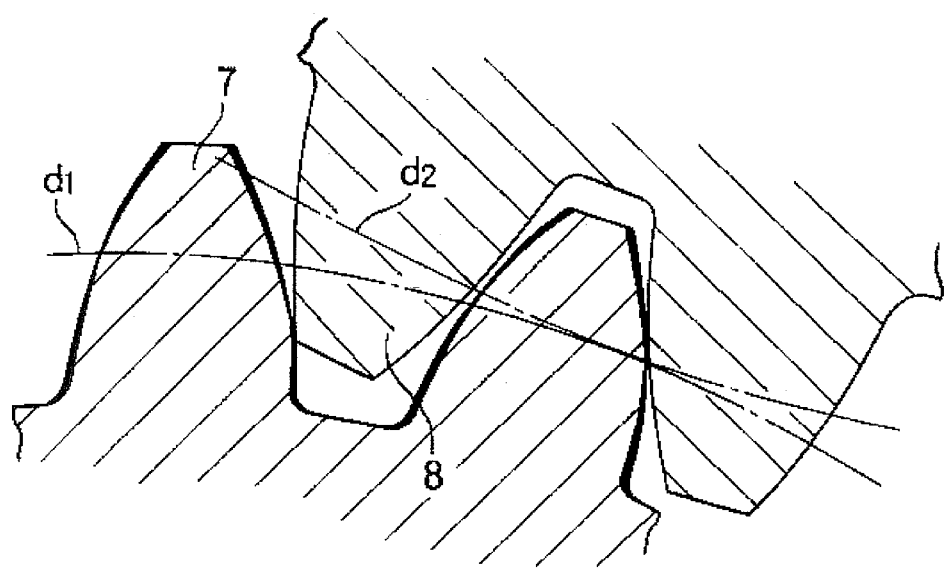
FIG. 1 illustrates the intermeshing state of a gear device according to a first embodiment of the present invention.

One embodiment of the present invention will now be described with reference to the drawings. FIG. 1 illustrates the intermeshing state of a gear device of the present invention. A first gear 7 has a tooth profile obtained by a combination of a correction curve which will be described in detail below and an involute curve. As indicated by portions filled in with black in FIG. 1, both addendum and dedendum portions of the first gear 7 are corrected by the correction curve expressed by the below-mentioned equation (3). That is, the outer line including the portions filled in with black indicates the standard tooth profile obtained by the involute curve, while the inner line excluding such portions indicates the tooth profile after being shaved according to the correction curve. A second gear 8 having a tooth profile obtained according to the involute curve is constructed to be intermeshed with the first gear 7.

Figure 2:
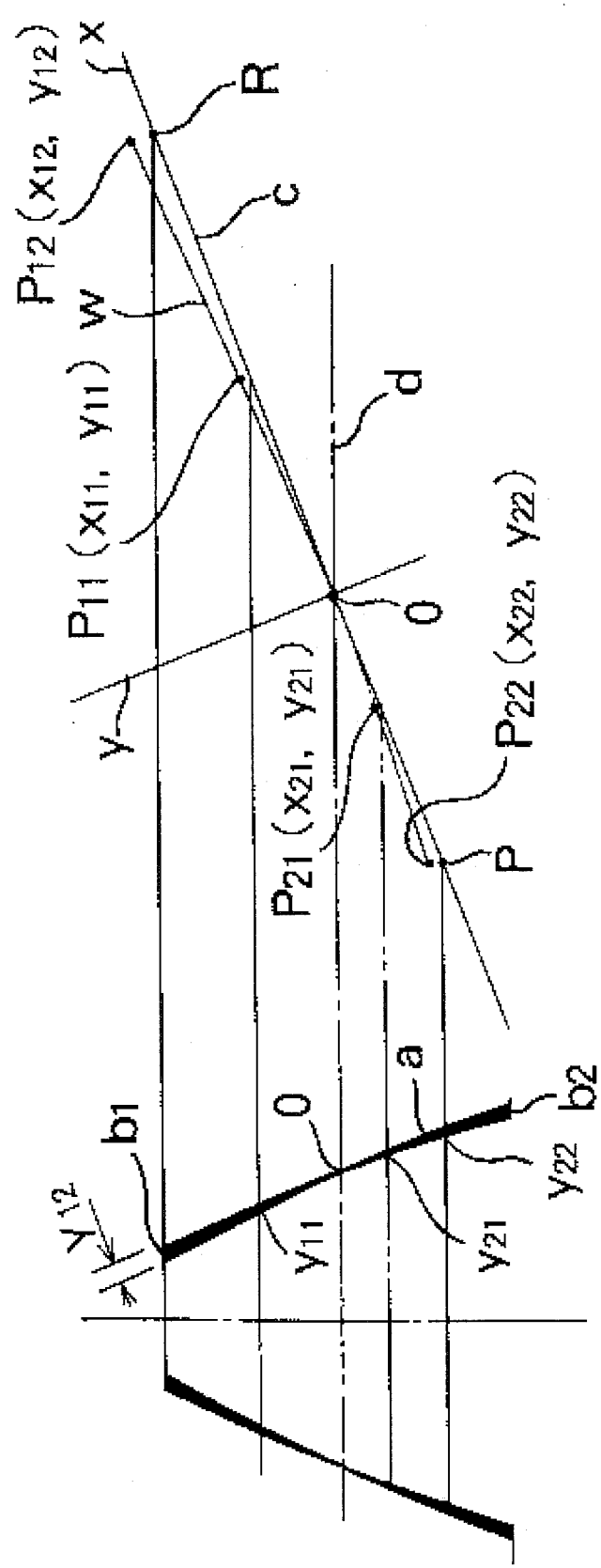
FIG. 2 illustrates the tooth-profile correction of the first embodiment.

FIG. 2 illustrates the correction of the tooth profile. C is the line of action (length of intermeshing) indicating a locus of the intermeshing points of the gears 7 and 8. The x axis is set on the line of action C. O is the intermeshing pitch point and is the origin at which the x and y axes cross at right angles with each other. P shows the starting point at which the gears start to intermesh with each other, while R indicates the end point at which the gears finish intermeshing with each other. The value x of the x axis indicates the length of intermeshing from the origin O and also indicates the position in which the value x is projected on the involute curve. The value y of the y axis represents the correction amount of the tooth profile and means the correction amount in the direction perpendicular to the involute curve at the position x.

W is the correction curve passing through $P_{11}(x_{11}, y_{11})$, $P_{12}(x_{12}, y_{12})$, $P_{21}(x_{21}, y_{21})$, $P_{22}(x_{22}, y_{22})$, and the origin, that is, the pitch point, which correction curve is calculated according to equations (1), (2) and (3), thereby determining the tooth profile of the gear 7. For example, $P_{12}(x_{12}, y_{12})$ means the correction amount $y_{12}$ of the tooth profile in the direction perpendicular to the involute curve at the correction position $x_{12}$ (which is the position on the involute curve at the addendum when projected in FIG. 2). $\underline{d}$ indicates the intermeshing pitch line, and $\underline{a}$ represents the tooth profile obtained according to the involute curve (the outer line including the portions filled in with black in FIG. 2). $\underline{b_1}$ and $\underline{b_2}$ indicate the correction amount of the tooth profile according to the correction curve W.

In the present invention, each tooth profile is formed so that at least one of the tooth profile is corrected based on the correction amount obtained by the correction curve and that combined correction amount of the first and second gears becomes to be equal to the correction amount obtained by the correction curve. A detailed explanation will now be given of the correction curve with reference to equations (1), (2) and (3). Plane coordinates consist of an x axis, the origin at which the x axis intersects with the intermeshing pitch circle of the gears, and a y axis intersecting with the x axis at the origin, the x axis indicating the line of action, that is, the locus along which the intermeshing point moves while the first gear provided with the tooth profile obtained according to the involute curve transfers power to the second gear. On the above-mentioned plane, when $x_1 < x_2$ and $y_1 < y_2$, the correction curve passes through $P_1(x_1, y_1)$ and $P_2(x_2, y_2)$ and is expressed by equation (3) having m determined by equation (1) and n determined by equation (2), equations (1) and (2) satisfying the conditions of: $y=0$ and $dy/dx=0$ at the origin. The foregoing equations (1), (2) and (3) are expressed as follows:

$$m = \frac{y_1}{x_1^n} = \frac{y_2}{x_2^n} \qquad (1)$$

$$n = \frac{\log_e \frac{y_2}{y_1}}{\log_e \frac{x_2}{x_1}} \quad (2)$$

$$y = mx^n \quad (3)$$

The above equations will now be explained more specifically. Point $P_2$ $(x_2, y_2)$ assumes point $P_{12}$ $(x_{12}, y_{12})$ in FIG. 2. Accordingly, $x_2$ is the position at the addendum of the gear having a tooth profile obtained by an involute curve, and $y_2$ is determined as a correction amount at $x_2$. As a value $y_2$, a correction amount which has been conventionally determined can be used by way of example. Such a value is exemplified in general literature (indicated by "*") of this technical field. Point $P_1$ $(x_1, y_1)$ assumes point $P_{11}(x_{11}, y_{11})$ in FIG. 2. In FIG. 2, $x_1$, which is the anchoring point, is positioned in the mid-point between the origin O and R. In general, such an anchoring point may be positioned anywhere between the origin O and $x_2$. However, for better clarity of representation for a change in the anchoring point, it assumes the position displaced from the origin O by three quarters of the distance between the origin O and $x_2$. On the other hand, $y_1$ indicates the correction amount from $x_1$ on the line of action (the x axis) to the point obtained by projecting $x_1$ on the gear having a tooth profile obtained by an involute curve. $y_1$ is displaced as a variable.

*: (1) ISO/TC 60/SC 3/WG 12 Doc N 6

After $x_2$, $y_2$ and $x_1$ are thus fixed, $y_1$ assumes a value which is nearly one half of $y_2$. Thus, n is determined in the foregoing equation (2), and the determined n is substituted into equation (1) so that m is determined. Then, a correction curve $y=mx^n$ in equation (3) can be determined. This correction curve is combined with the involute curve of the tooth profile so that the resultant tooth profile can be designed and formed. That is, the amount of a disparity between the correction curve and the involute curve is shaved in perpendicular to the tooth surface from at least one of the gears, thereby forming the tooth profile. In the present case, the tooth profile is formed by shaving the tooth surface of the first gear without shaving the second gear as it is.

Although $y_1$ has assumed only one value as described above, $y_1$ may similarly assume more than one value at the center of the value nearly one half of $y_2$ as obtained above. Accordingly, respective correction curves expressed by equation (3) $y=mx^n$ can be determined, and various types of tooth profiles can be designed by a combination of the respective correction curves and the involute curve.

Each of the tooth profile of the gears which have thus been determined based on equations (1)–(3) is applied to the original tooth profile of at least one of the gears. Based on thus-obtained various types of pairs of gears, the load distribution rates (load F) of the respective gears 7 and 8 are calculated. A pair of gears are selected so that the load distribution rate forms a curve 9a(10a) increasing upward and a curve 9c (10c) decreasing downward in a projection-like form as shown in FIG. 3 and described below.

Figure 3:
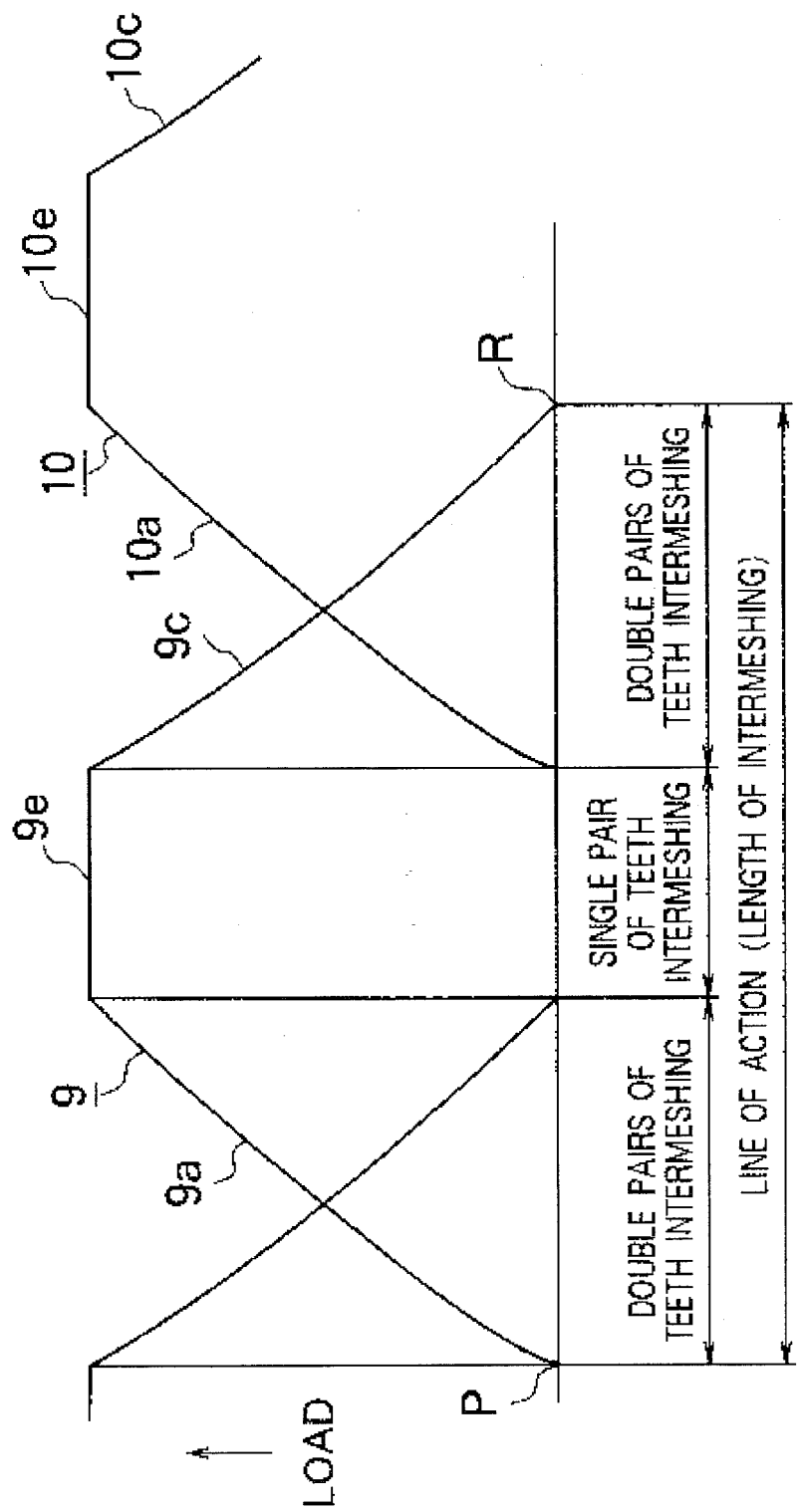
FIG. 3 is a diagram illustrative of the tooth load distribution rate of the first embodiment.

Referring to FIG. 3, a curve 9 indicates the load distribution rate of the teeth intermeshed with each other adjacent to the line of recess (intermeshing points $Q_{11}$–$Q_{14}$ of FIG. 22) of the gears 7 and 8. The curve 9 starts to increase along the increasing curve 9a, then becomes stagnant along the straight line 9b indicative of the maximum load distribution rate, and finally decreases along the decreasing curve 9c. A curve 10 indicates the load distribution rate of the teeth intermeshed with each other adjacent to the line of approach (intermeshing points $Q_{22}$–$Q_{25}$ of FIG. 22) of the gears 7 and 8. The curve 10 starts to increase along the increasing curve 10a from the end point of the maximum load distribution region of the curve 9, then becomes stagnant from the zero point of the load distribution rate of the curve 9 along the straight line 10b indicative of the maximum load distribution rate, and finally decreases along the decreasing curve 10c. The curve 10 is also formed in a projection-like shape.

The load distribution rates of the respective gears 7 and 8 are thus determined. Then, a calculation is made for the product F·v of the load F allocated to each of the gears and the relative sliding velocity v of the intermeshing surface of contact. The product F·v with respect to the displacement of the intermeshing point of, for example, the gear 7, is shown as the F·v curve 11 in FIG. 4. The F·v curve 11 is indicated by a first curve 11a starting from starting point P at which the gear 7 starts to intermesh with the gear 8 to intermeshing pitch point O and a second curve 11b starting from intermeshing pitch point O to end point R at which the gear 7 finishes intermeshing with the gear 8. The curve 11 shows that the product F·v of the load F and the relative sliding velocity v after the point at which the maximum load of the gear 7 starts to decrease becomes smaller than the product of the relative sliding velocity v and the maximum load at the above-mentioned point. This results from the construction of the curve 9 (10) which increases along the curve 9a (10a) and decreases along the curve 9b (10b), both curves 9a (10a) and 9b (10b) being formed in a projection-like shape.

Figure 4:
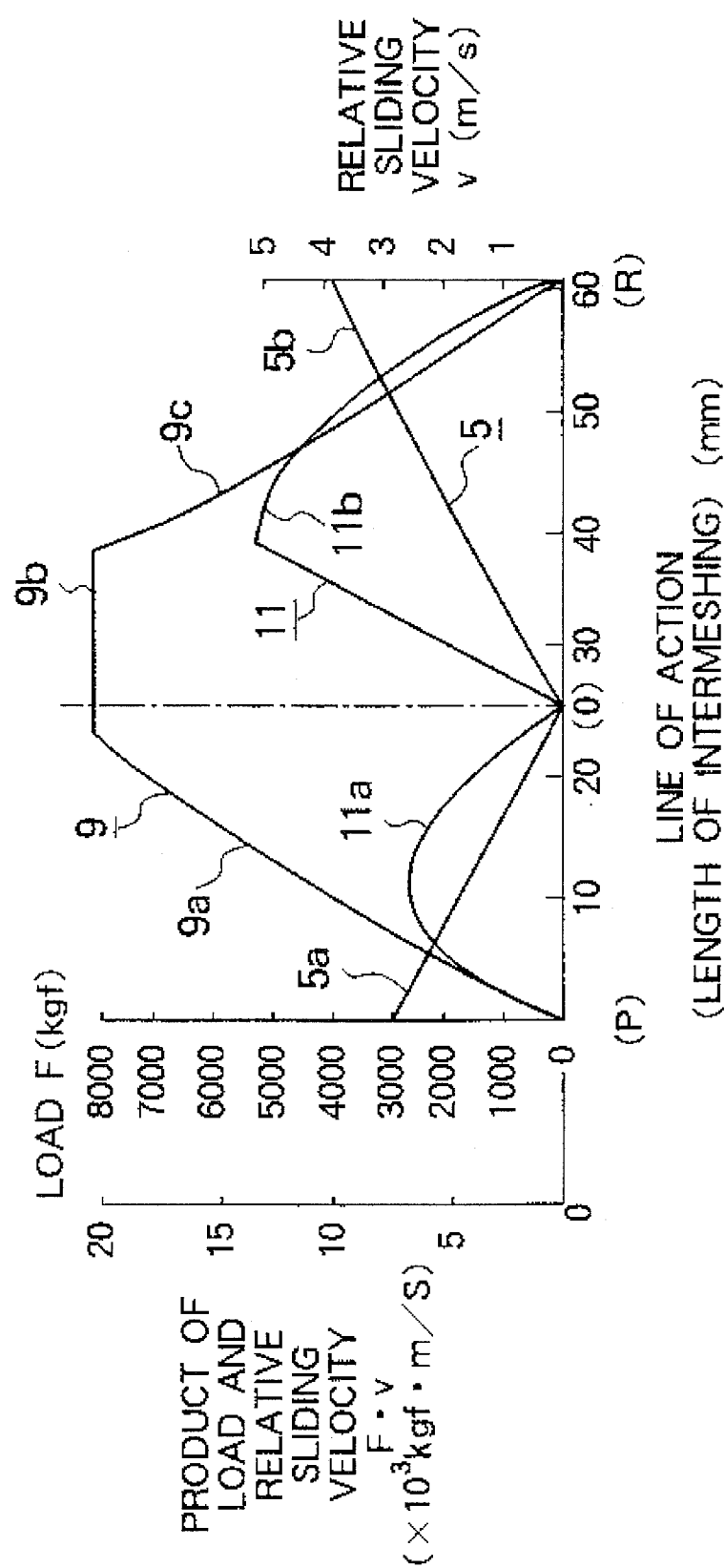
FIG. 4 is a diagram illustrative of the load F acting on teeth, the relative sliding velocity v and the product F·v of the load F and the relative sliding velocity v according to the first embodiment, all components being indicated with respect to the line of action (length of intermeshing)
Figure 23:
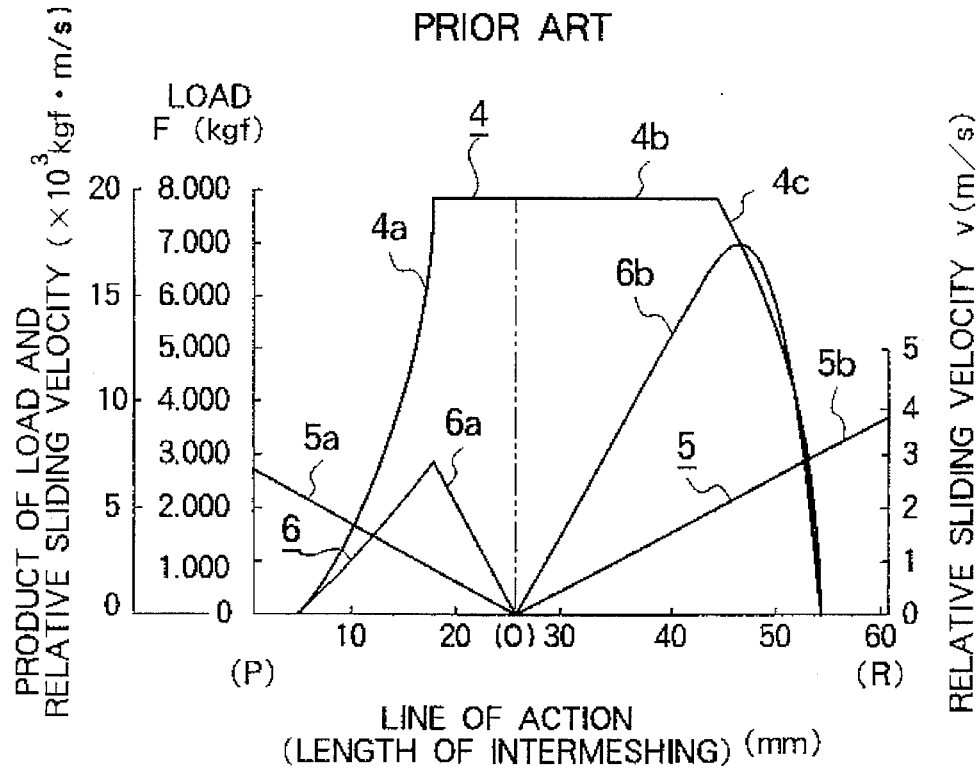
FIG. 23 is a diagram illustrative of the load F acting on teeth, the relative sliding velocity v and the product F·v of the load F and the velocity v, all components being indicated with respect to the line of action of a conventional gear device.

In order to lower the peak value of the product F·v, as is seen from FIG. 4, the load F adjacent to the higher degree of relative sliding velocity v on the tooth surface of contact should be decreased downward in a projection-like curve. In FIG. 4, the relative sliding velocity v adjacent to point R is higher than that adjacent to point P bordered by pitch point O so that the curve 9c adjacent to point R decreases downward in a projection-like form. This contrasts with the product F·v exhibited by conventional gears which increases upward in a projection-like form or which is indicated by a linear curve, as shown in FIG. 23.

The correction curve W to satisfy the condition that the peak value of the product F·v becomes minimum is calculated by a computer so that the tooth profile can be determined, thereby enabling a reduction in the amount of the local frictional heat generated at the tooth surface.

A comparison was made for the maximum product F·v of the gear obtained according to a conventional method of correcting the tooth profile and that according to the present invention. For example, when the maximum load to both gears was set to be equal, the product F·v of the gear according to the conventional correction method resulted in approximately 18,000 kgf·m/second, while the product F·v of the gear according to a correction method of the present invention resulted in approximately 12,500 kgf·m/second, which was a reduction to approximately 70% of the value according to the conventional method.

Figure 5:
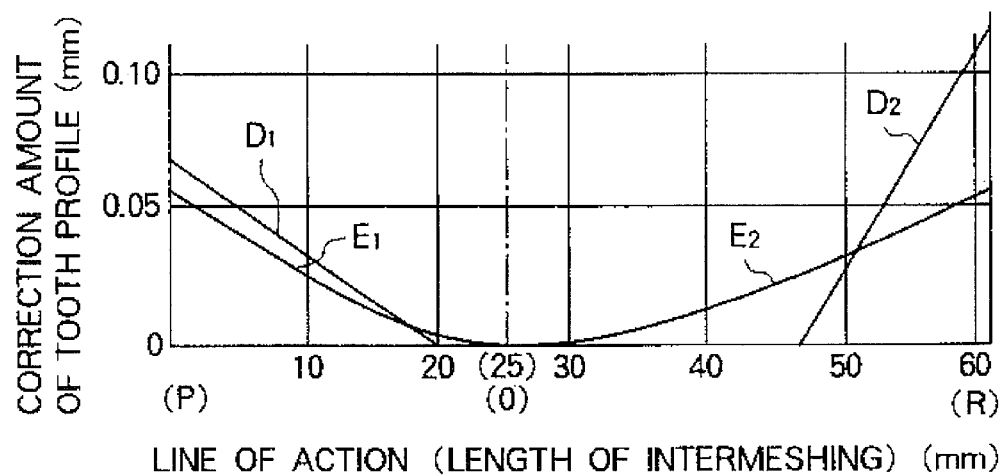
FIG. 5 is a diagram illustrative of the tooth-profile correction amount of the first embodiment and a conventional tooth-profile correction amount.

FIG. 5 illustrates a comparison of the correction amount of the tooth profile according to the present invention and that according to the conventional method. FIG. 5 shows the correction amount with respect to the line of action starting from the starting point of contact P at which the gears start to intermesh with each other to the intermeshing end point of contact R via the intermeshing pitch point O. The correction amount of the conventional tooth profile is indicated by $D_1$ and $D_2$, while that according to the present invention is indicted by $E_1$ and $E_2$.

Figure 6:
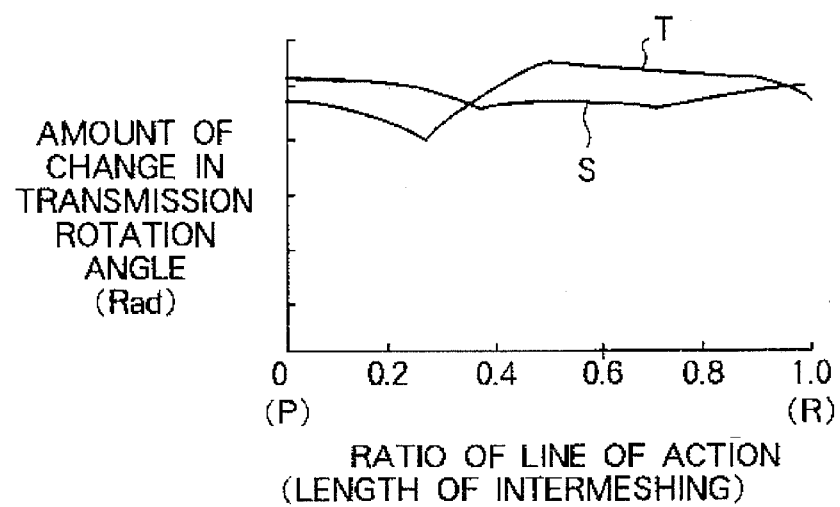
FIG. 6 is a diagram illustrative of a pattern of a change in the rotation angular velocity when gears are intermeshed while being rotated, such a pattern being indicated by a comparison between the gear device of the first embodiment and a conventional gear device.

An example will be given of a change in the angular velocity of a driven gear assuming that the gear 7 is a driving gear and the gear 8 is a driven gear by way of example. FIG. 6 illustrates such a change in the angular velocity of the driven gear 8 while the driving gear 7 rotates at equal velocity. In other words, FIG. 6 indicates the time change pattern due to the rotation lag. The horizontal axis indicates a ratio of the line of action (length of intermeshing) starting from the starting point of contact P to the end point of contact R, while the vertical axis represents the amount of a change in the transmission rotation angle (Rad). T indicates a conventional gear device, while S represents a gear device of the present invention.

FIG. 6 clearly shows theft the gear device of the present invention performs the smooth transmission of a rotation force over the conventional gear device.

Second Embodiment

Figure 22A:
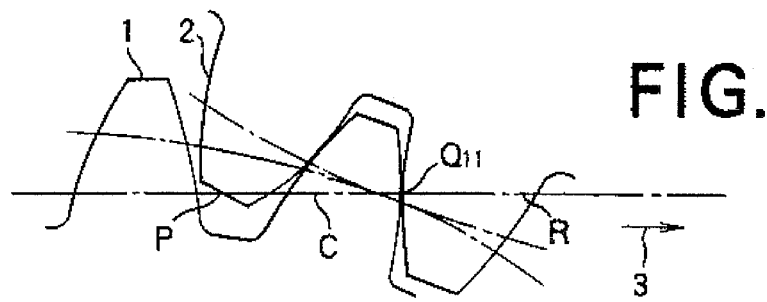
FIGS. 22A–22E illustrate the displacement of intermeshing points of gears.
Figure 22B:
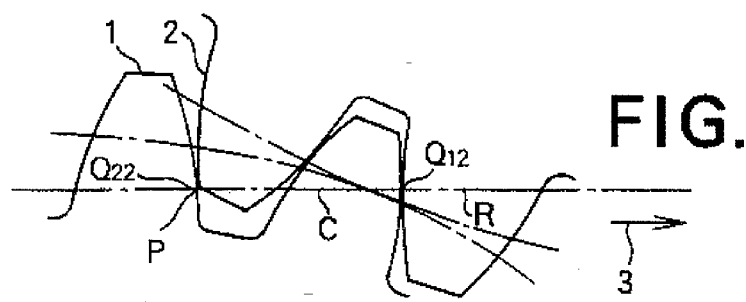
Figure 22C:
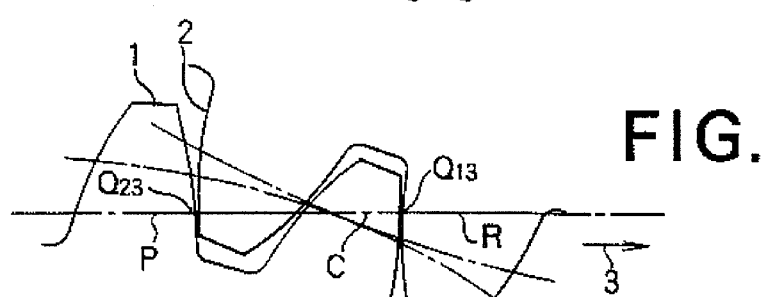
Figure 22D:
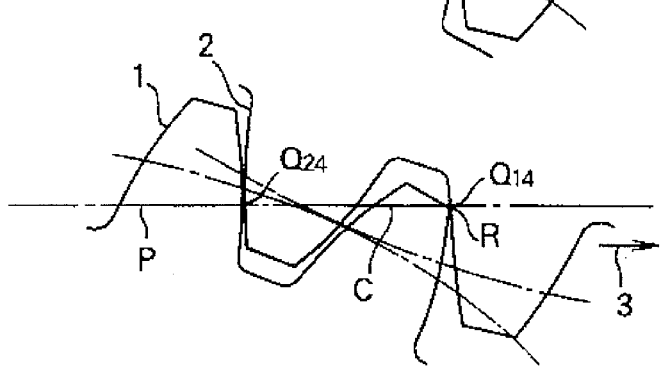

The gears start to intermesh with each other at $Q_{22}$ shown in FIG. 22B and finish at $Q_{14}$ shown in FIG. 22D. In such a case, an unsuitable correction of the tooth profile brings about an abrupt collision occurring at the tooth surface when the gears start to intermesh with each other, thereby generating a large amount of frictional heat and vibration.

Figure 22E:
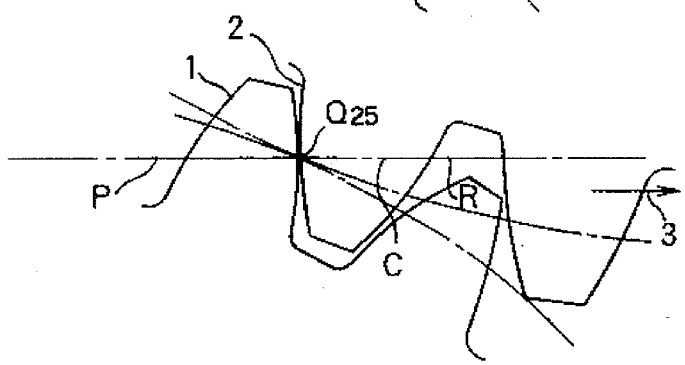

Therefore, in order to avoid a collision at the initial state of the gear intermeshing, if the tooth profile is corrected so that the transmission load is gradually increased until only a pair of teeth are intermeshed with each other as indicated by $Q_{25}$ of FIG. 22E, the vibration occurring to the gears can be reduced.

Figure 7:
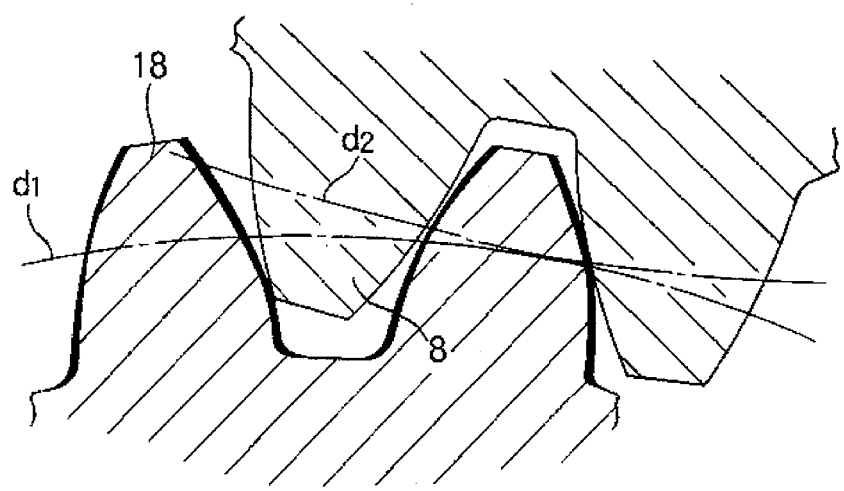
FIG. 7 illustrates the intermeshing state of a gear device according to a second embodiment of the present invention.
Figure 8:
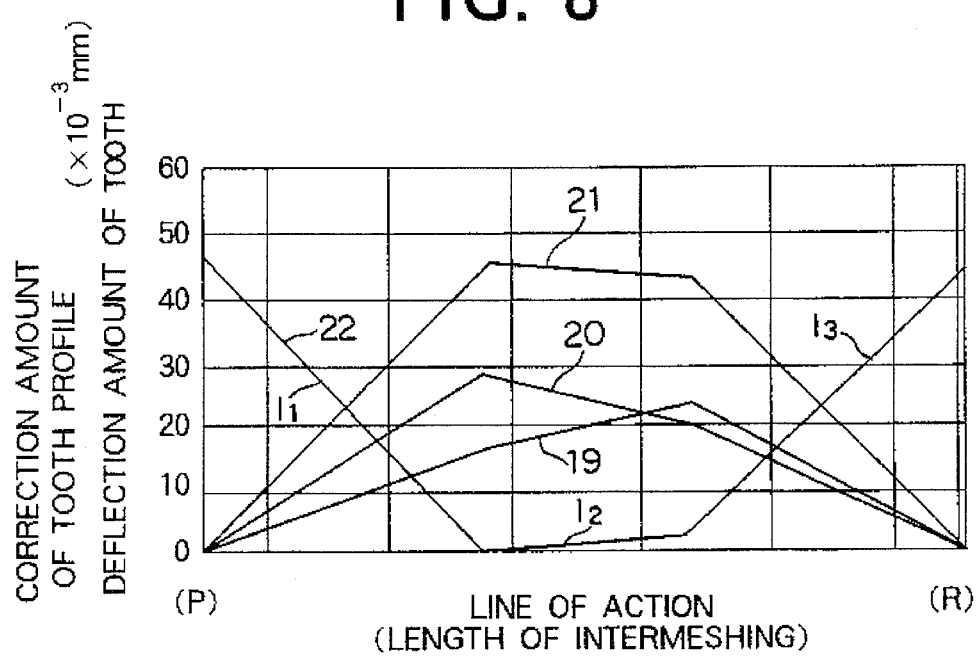
FIG. 8 is a diagram illustrative of tooth deflection characteristics according to the second embodiment.

FIG. 7 illustrates the intermeshing state of the gears according to the second embodiment. FIG. 8 shows deflection characteristics of the teeth shown in FIG. 7. More specifically, FIG. 8 indicators deflection characteristics of the teeth when the tooth profile is corrected according to equations (1), (2) and (3) shown in the first embodiment so that the load and the deflection of the intermeshing teeth are gradually increased.

In FIGS. 7 and 8, a first gear 18 is formed by the tooth profile obtained by a combination of a below-mentioned sixth tooth-profile correction curve and the involute curve. The first gear 18 is constructed to intermesh with the second gear 8. Both addendum and dedendum portions of the first gear 18 are corrected, as indicated by the portion filled in with black.

A characteristic line 19 indicates the tooth deflection of the first gear 18, and shows that the deflection amount increases gently since the teeth intermeshing starts from the dedendum portions, while the deflection amount decreases sharply since the teeth intermeshing ends at the addendum portions. A characteristic line 20 indicates the tooth deflection of the second gear 8, and shows that the deflection amount increases sharply since the teeth intermeshing starts from the addendum portions and decreases gently since the teeth intermeshing ends at the dedendum portions. A characteristic line 21 is obtained by a combination of the deflection amount of the first gear 18 and that of the second gear 8. Reference numeral 22 indicates an ideal tooth-profile correction curve which is formed of $I_1$, $I_2$ and $I_3$ whereby at least one of the gears 8 and 18 is corrected so that the rotation lag of the second gear 8 due to the deflection of the gears 8 and 18 can be compensated, thereby approximating the rotation of the second gear 8 to an equal velocity.

Figure 9:
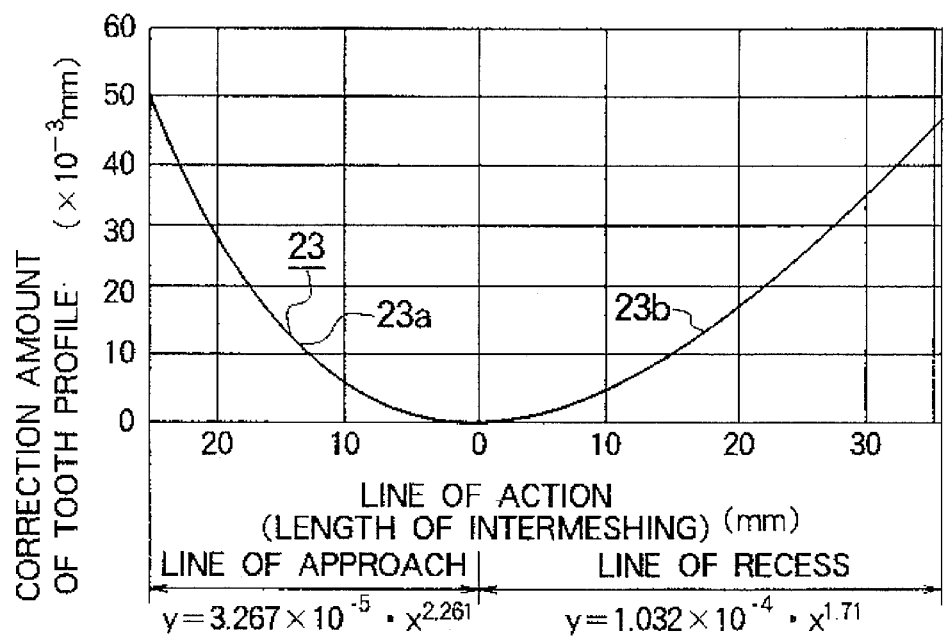
FIG. 9 is a diagram illustrative of the correction amount employed whereby the peak value of the heat generated at the tooth surface can be minimized according to the second embodiment.

FIG. 9 illustrates a correction curve obtained by equations (1), (2) and (3) according to the second embodiment so that the peak value of the frictional heat generated due to the sliding at the teeth surfaces can be minimized. Referring to FIG. 9, reference numeral 23 indicates a first tooth-profile correction curve used for minimizing the peak value of the product F·v of the load F acting on the intermeshing teeth and the relative sliding velocity v at the area of contact between a pair of teeth. The first correction curve 23 is formed of a curve 23a with respect to the line of approach and a curve 23b with respect to the line of recess. In an example shown in FIG. 7, the line of approach is adjacent to the dedendum portions of the gear 18, while the line of recess is adjacent to the addendum portions of the gear 18.

Figure 10:
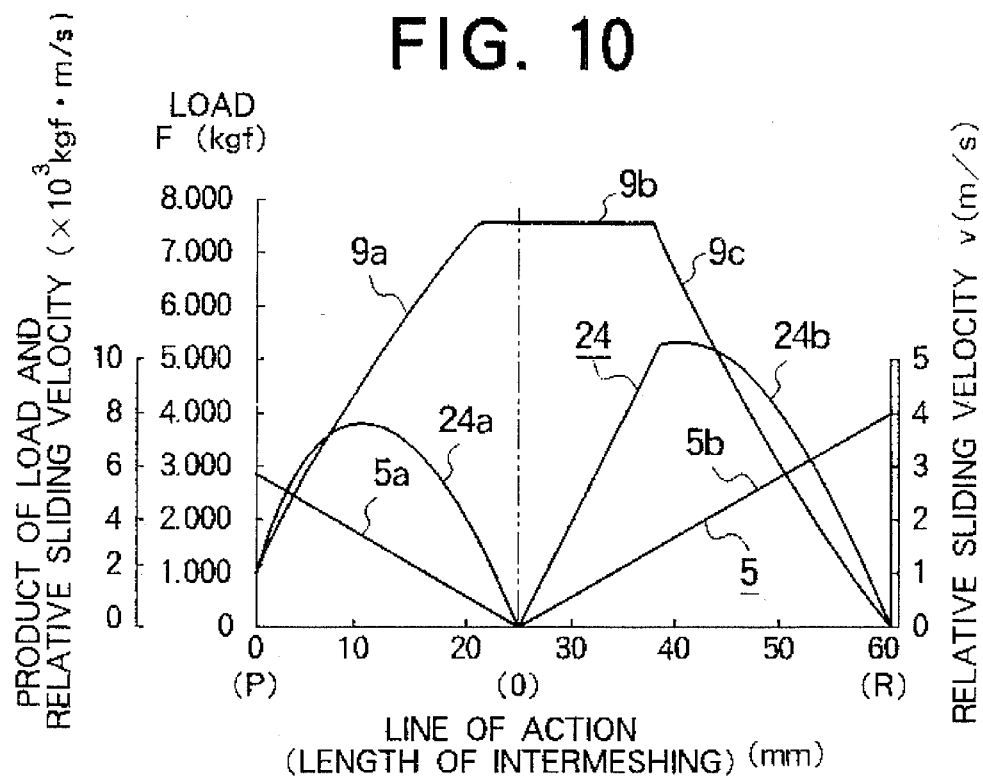
FIG. 10 is a diagram illustrative of the load F, the relative sliding velocity v and the product F·v of the load F and the relative sliding velocity v, all components being indicated with respect to the line of action of the gears corrected by the first tooth-profile correction curve of the second embodiment.

FIG. 10 illustrates the load F acting on the teeth, the relative sliding velocity v and the product F·v of the load F and the velocity v with respect to the line of action (the length of intermeshing) of the gears. Referring to FIG. 10, a F·v curve 24 of the teeth of the gear 18 is formed of a first curve 24a starting from the starting point of intermeshing with the teeth of the gear 8 to the pitch point O and a second curve 24b starting from the pitch point O to the end point R of intermeshing with the gear 8. The first tooth-profile correction curve is constructed such that the product F·v of the load F and the relative sliding velocity v after the point at which the maximum load starts to decrease is smaller than the product of the relative sliding velocity v and the maximum load at the above-mentioned point.

Figure 11:
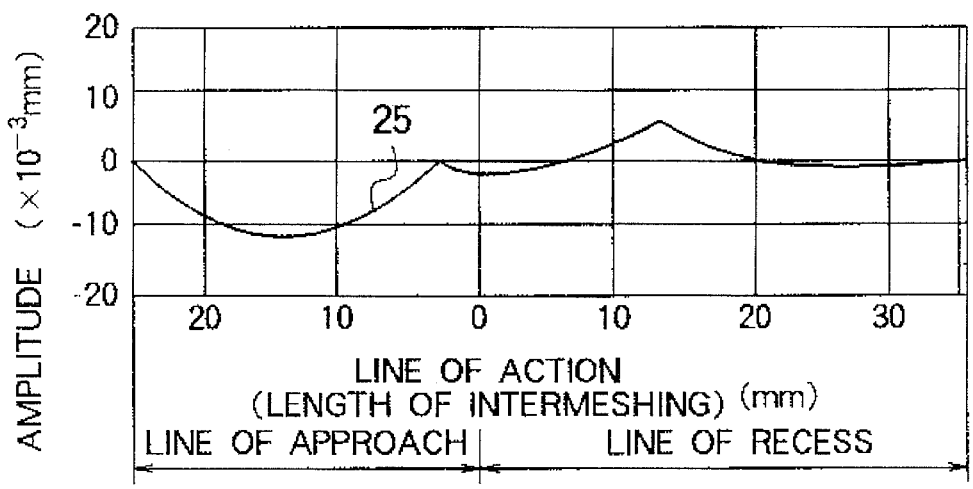
FIG. 11 is a diagram illustrative of an amplitude caused by a vibration occurring to the gear having the tooth profile corrected by the first correction curve shown in FIG. 9.

FIG. 11 illustrates an amplitude curve 25 indicative of the vibration occurring to the gear formed by the tooth profile corrected by the first tooth-profile correction curve 23 shown in FIG. 9. FIG. 11 shows that the gear adjacent to the line of approach exhibits a much higher level of amplitude than that adjacent to the line of recess.

Subsequently, an amplitude curve of each of the pairs of gears which are designed based on calculations of equations (1)–(3) is depicted as shown in FIG. 11. Among such amplitude curves, the one showing the minimized torsional vibration is selected with the aid of computer.

Figure 12:
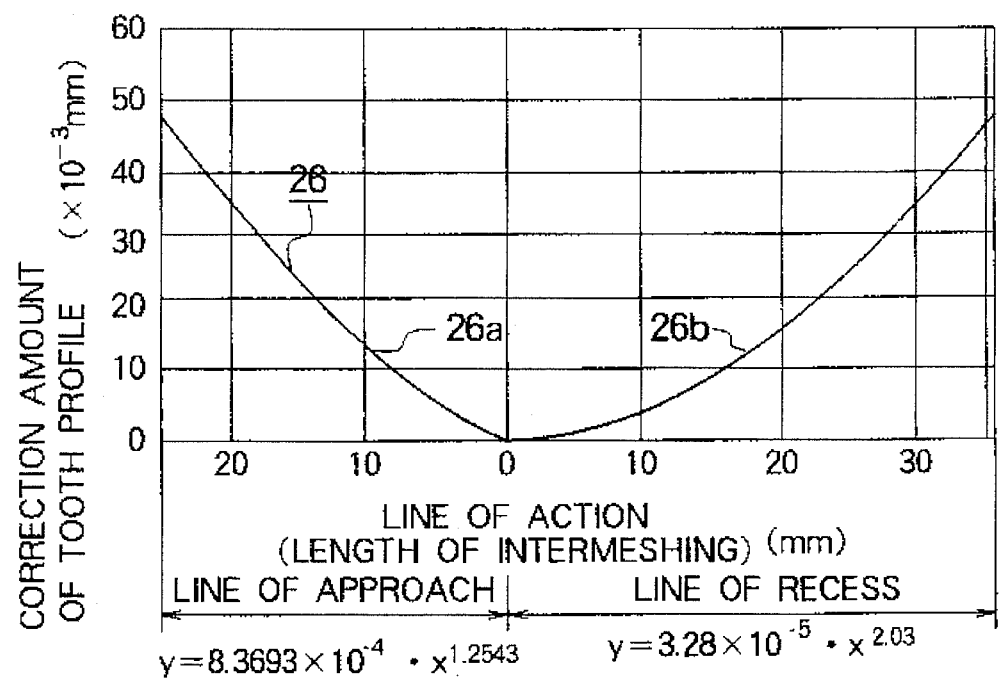
FIG. 12 is a diagram illustrative of the tooth-profile correction amount employed whereby torsional vibration can be minimized according to the second embodiment.

FIG. 12 illustrates the correction amount of the tooth profile based on equations (1), (2) and (3) according to the second embodiment whereby torsional vibration can be minimized. In FIG. 12, a tooth-profile correction curve 26 is formed of a curve 26a with respect to the line of action adjacent to the line of approach and a curve 26b with respect to the line of action adjacent to the line of recess.

Figure 13:
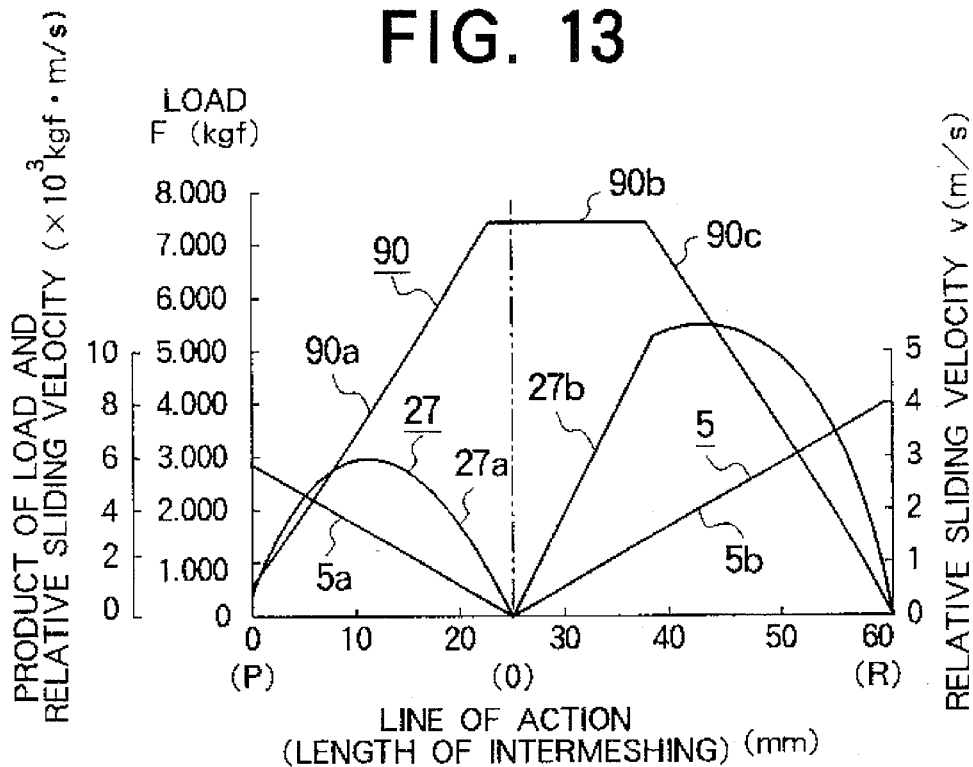
FIG. 13 is a diagram illustrative of the load F acting on teeth, the relative sliding velocity v and the product F·v of the load F and the relative sliding velocity v, all components being indicated with respect to the line of action of the gears corrected by the second tooth-profile correction curve of the second embodiment.

FIG. 13 illustrates the product F·v obtained when the tooth profile of the gear is corrected according to the second tooth-profile correction curve 26 shown in FIG. 12. In FIG. 13, a F·v curve 27 of the tooth of the gear 18 is formed of a first curve 27a starting from starting point P of intermeshing with the gear 8 to pitch point O and a second curve 27b starting from pitch point O to the intermeshing end point R. A curve 90 indicates the load distribution rate of the intermeshing teeth adjacent to the line of recess (indicated by points $Q_{11}$–$Q_{14}$ of FIG. 22). The curve 90 starts to increase along an increasing curve 90a, then becomes stagnant along a straight line 90b indicative of the maximum load distribution rate, and finally decreases along a decreasing curve 90c. The curve 90 is thus formed in a projection-like shape.

Figure 14:
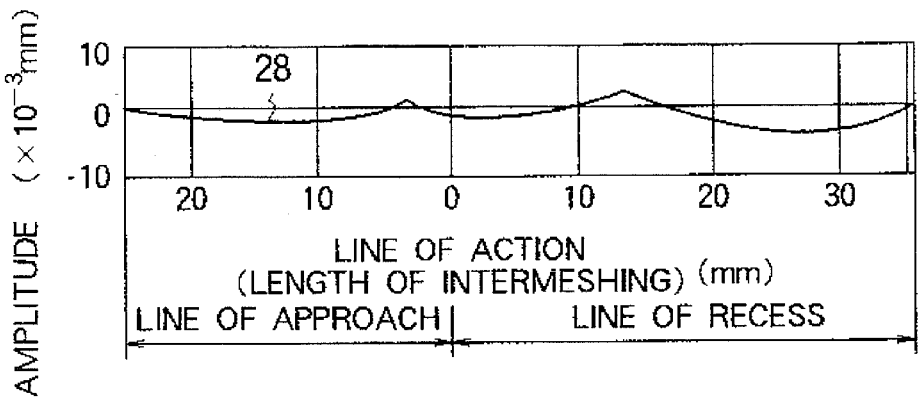
FIG. 14 is a diagram illustrative of an amplitude caused by a vibration occurring to the gear having a tooth profile corrected by the second correction curve of the second embodiment shown in FIG. 12.

FIG. 14 illustrates an amplitude curve 28 indicating the vibration of the gear obtained by correcting the tooth profile according to the second tooth-profile correction curve 26 shown in FIG. 12. As is seen from FIG. 14, a level of amplitude of the gear adjacent to both the line of approach and the line of recess is suppressed. By comparison between the curve 9c shown in FIG. 10 and the curve 90c shown in FIG. 13, it is understood that an excessively-sharp decrease in the curve 9c in a projection-like form causes an increase in vibration.

Figure 15:
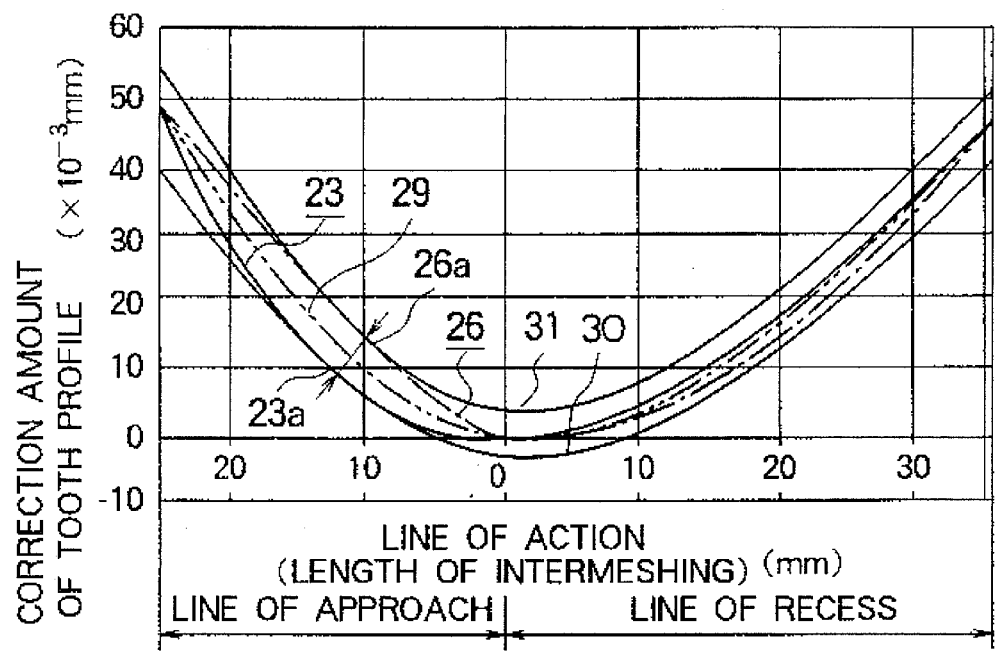
FIG. 15 s a diagram illustrative of a method of determining tooth-profile correction curves for minimizing the heat peak value and torsional vibration.

FIG. 15 illustrates a method of determining tooth-profile correction curves employed whereby the heat peak value and torsional vibration can be reduced.

Referring to FIG. 15, as shown in FIG. 9, the first tooth-profile correction curve 23 indicates the correction amount of the tooth profile whereby the peak value of the frictional heat generated due to the sliding at the tooth surface can be minimized.

Moreover, as shown in FIG. 12, the second tooth-profile correction curve 26 indicates the correction amount of the tooth profile whereby torsional vibration due to the gear intermeshing can be minimized.

The first and second tooth-profile correction curves 23 and 26 are depicted on the same plane coordinates.

A third tooth-profile correction curve 29 indicates a mean value of the first correction curve 23 and the second correction curve 26. A fourth tooth-profile correction curve 30 is depicted so that it externally contacts the point 23a of the first correction line 23 at the broadest spacing between the first and second correction curves 23 and 26, that is, between the point 23a and the point 26a and that the fourth correction curve 30 is in parallel to the third correction curve 29, namely, the spacing between the fourth correction curve 30 and the third correction curve 29 is constantly the same. A fifth tooth-profile correction curve 31 is depicted so that it internally contacts the second correction curve 26 at the point 26a and that the fifth correction curve 31 is in parallel to the third correction curve 29, namely, the spacing between the fifth correction curve 31 and the third correction curve 29 is constantly the same.

At least one of the tooth profile is corrected so as to exist a sixth tooth-profile correction curve (not shown) obtained by combining to add the correction amounts of the each gears on the x axis between the thus-obtained fourth and fifth correction curves 30 and 31, thereby minimizing the peak frictional heat value and reducing torsional vibration.

In order to suppress the peak heat value, the sixth correction curve should be approximated to the first correction curve 23. Conversely, in order to suppress torsional vibration, the sixth correction curve should be approximated to the second correction curve 26.

It should be noted that the first and second correction curves 23 and 26 slightly deviate from the ideal correction curve 22 shown in FIG. 8. This is because of the use of the foregoing approximate expression (3) for convenience of the computer-aided optimal designing. However, such a deviation is only a few µm or less, which does not thus present any practical problem.

Third embodiment

Figure 16:
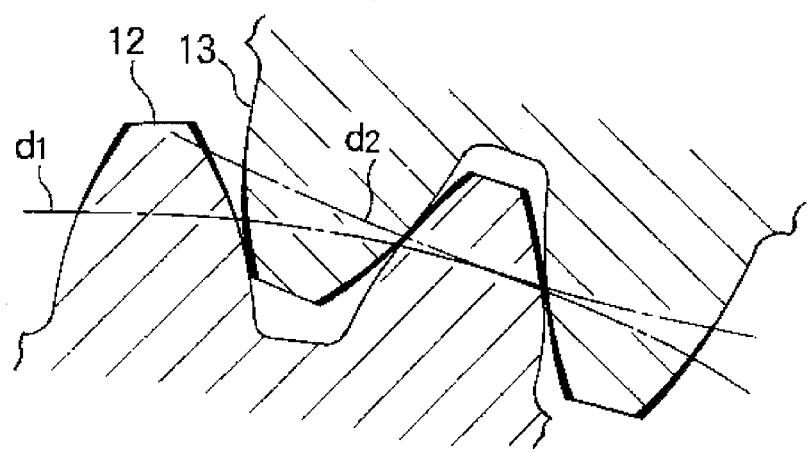
FIG. 16 illustrates the intermeshing state of a gear device according to a third embodiment of the present invention.

FIG. 16 illustrates the tooth-profile correction performed only for the addendum portions of gears 12 and 13 according to the correction curve obtained by equation (3), the addendum portions to be corrected being bordered by the pitch circles $d_1$ and $d_2$ of the gears 12 and 13. In such a case, advantages similar to those obtained in the first and second embodiments can also be expected. More specifically, in this embodiment, the correction amount of the dedendum portions of the first gear 7 shown in FIG. 7 is allocated to the addendum portions of the second gear 13 shown in FIG. 16, and the correction amount of the addendum portions of the same gear 7 is allocated to the addendum portions of the first gear 12. The correction amount performed only for a first gear is thus divided into first and second gears. Similar advantages in both cases can be expected.

Fourth Embodiment

Figure 17:
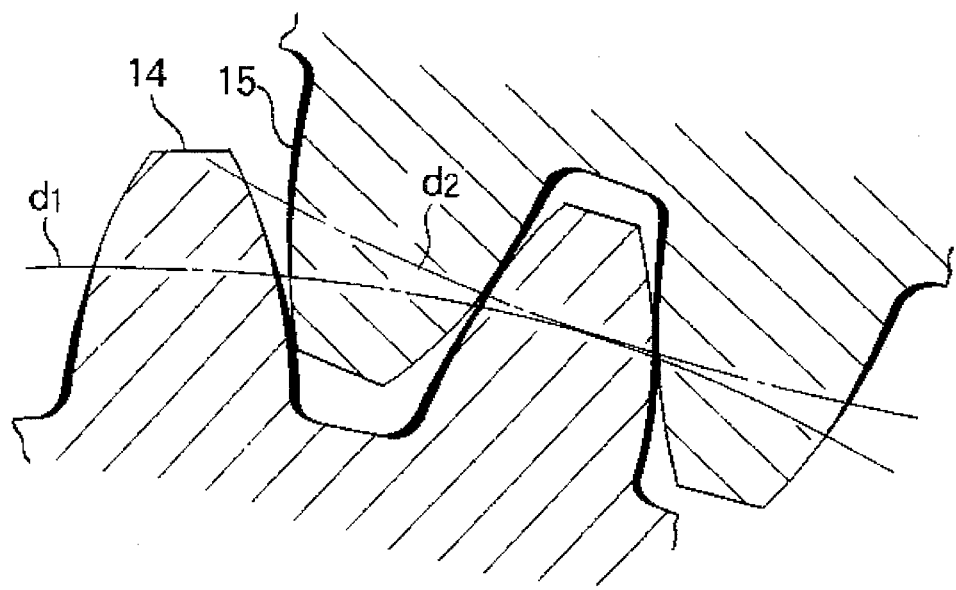
FIG. 17 illustrates the intermeshing state of a gear device according to a fourth embodiment of the present invention.

FIG. 17 illustrates the tooth-profile correction performed only for the dedendum portions of gears 14 and 15 according to the correction curve obtained by equation (3), the dedendum portions to be corrected being bordered by the pitch circles $d_1$ and $d_2$ of the gears 14 and 15. Advantages similar to those obtained in the foregoing embodiments can also be expected.

Fifth Embodiment

Figure 18:
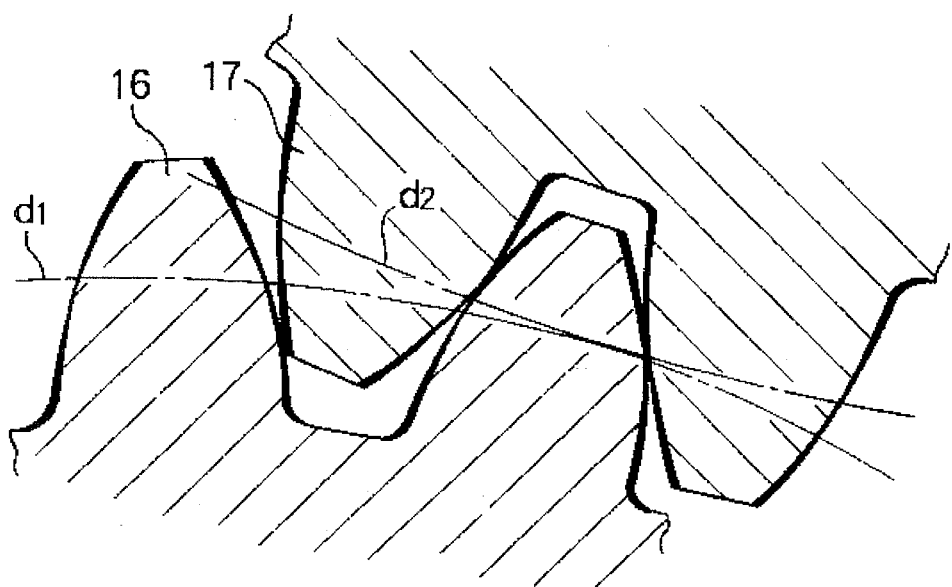
FIG. 18 illustrates the intermeshing state of a gear device according to a fifth embodiment of the present invention.
Figure 19:
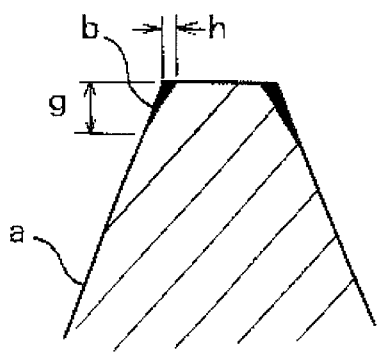
FIG. 19 illustrates the configuration obtained by performing one type of tooth-profile correction on a conventional gear.
Figure 20:
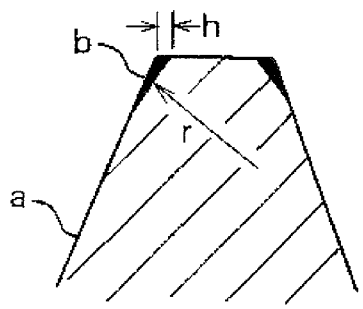
FIG. 20 illustrates the configuration obtained by performing another type of tooth-profile correction on a conventional gear.
Figure 21:
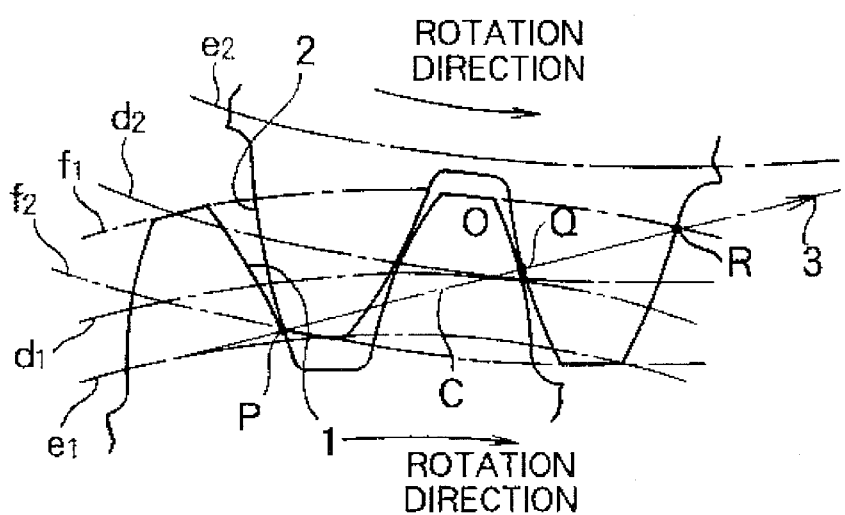
FIG. 21 illustrates the intermeshing state of a pair of gears.

FIG. 18 illustrates the tooth-profile correction conducted so that the sum of the correction amounts (namely, combined correction amounts of both gears) performed for the addendum and dedendum portions of gears 16 and 17 can be indicated by the correction amount obtained by equation (3), the addendum and dedendum portions to be corrected being bordered by the pitch circles $d_1$ and $d_2$ of the gears 16 and 17. Advantages similar to those obtained in the foregoing embodiments can also be expected.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A gear device comprising a first gear and a second gear each having a tooth profile formed by an involute curve, and wherein at least one of said tooth profiles is corrected based on a correction amount obtained by a correction curve and that a combined correction amount of said first and second gears is equal to said correction amount obtained by said correction curve, said correction curve being expressed by the following equation (3) having m determined by the following equation (1) and n determined by the following equation (2) on plane coordinates consisting of an x axis, an origin and a y axis which intersects with said x axis at said origin, said x axis being a line of action indicative of a locus along which an intermeshing point moves while said first gear transmits a force to said second gear, said origin disposed at a location at which said x axis intersects with an intermeshing pitch circle of said first and second gears, said equations (1) and (2) passing through points $P_1(x_1, y_1)$ and $P_2(x_2, y_2)$ and satisfying the conditions of: y=0, dy/dx=0 at said origin when $x_1<x_2$ and $y_1<y_2$; and wherein:

$$m = \frac{y_1}{x_1^n} = \frac{y_2}{x_2^n} \tag{1}$$

$$n = \frac{\log_e \frac{y_2}{y_1}}{\log_e \frac{x_2}{x_1}} \tag{2}$$

$$y = mx^n. \tag{3}$$

2. A gear device according to claim 1 wherein an increasing curve of a load acting on intermeshing teeth of said gears extends in an upwardly convex manner and a decreasing curve thereof extends in a downwardly convex manner.

3. A gear device according to claim 1 wherein one of an increasing curve and a decreasing curve of a load acting on intermeshing teeth of said gears, which curve is on a side in which a relative sliding velocity at a surface of contact of said teeth is higher, extends in a downwardly convex manner.

4. A gear device according to claim 1 wherein a product of a load due to the gear intermeshing and a relative sliding velocity immediately after a point at which the maximum load starts to decrease is smaller than a product of the relative sliding velocity and the maximum load at said point.

5. A gear device according to claim 1 wherein said corrected tooth profile obtained by a combination of said involute curve and said correction curve is formed only for an addendum portion bordered by the pitch circle of said gears.

6. A gear device according to claim 1 wherein said corrected tooth profile obtained by a combination of said involute curve and said correction curve is formed only for a dedendum portion of said gears bordered by the pitch circle of said gears.

7. A gear device according to claim 1 wherein said tooth profiles of each of said first and second gears are corrected, and wherein the combined correction amount of said first and second gears is equal to the correction amount obtained by said correction curve.

8. A gear device comprising a first gear and a second gear each having a tooth profile formed by an involute curve, wherein at least one of said tooth profiles is corrected by a sixth correction curve, and wherein said sixth correction curve is obtained by correction curves comprising:

first and second tooth-profile correction curves calculated based on the following equation (3) having m determined by the following equation (1) and n determined by the following equation (2) on plane coordinates consisting of an x axis, an origin and a y axis which intersects with said x axis at said origin, said x axis being a line of action indicative of a locus along which an intermeshing point moves while said first gear transmits a force to said second gear, said origin disposed at a location at which said x axis intersects with an intermeshing pitch circle of said first and second gears, said equations (1) and (2) passing through points $P_1(x_1, y_1)$ and $P_2(x_2, y_2)$ and satisfying the conditions of: y=0, dy/dx=0 at said origin when $x_1<x_2$ and $y_1<y_2$, said first tooth-profile correction curve being employed whereby a product of a load due to the gear intermeshing and a relative sliding velocity immediately after a point at which a maximum load starts to decrease is smaller than a product of the relative sliding velocity and the maximum load at said point, said second tooth-profile correction curve being employed whereby a vibration caused by the gear intermeshing is minimized; said first and second correction curves being depicted on said plane coordinates;

a third tooth-profile correction curve indicative of a mean value between said first and second correction curves; and a fourth tooth-profile correction curve being depicted so that it externally contacts said first correction curve at a broadest spacing between said first and second correction curves, and a fifth tooth-profile correction curve being depicted so that it internally contacts said second correction curve, wherein at least a portion of each of said fourth and fifth correction curves is parallel with said third correction curve, said sixth correction curve being disposed between said fourth and fifth correction curves, and wherein said sixth correction curve comprises a sum of correction amounts of each of said first and second gears on said x axis; and wherein:

$$m = \frac{y_1}{x_1^n} = \frac{y_2}{x_2^n} \quad (1)$$

$$n = \frac{\log_e \frac{y_2}{y_1}}{\log_e \frac{x_2}{x_1}} \quad (2)$$

$$y = mx^n. \quad (3)$$

9. A gear device according to claim 8 wherein an increasing curve of the load acting on intermeshing teeth of said gears extends in an upwardly convex manner and a decreasing curve thereof extends in a downwardly convex manner.

10. A gear device according to claim 8 wherein one of an increasing curve and a decreasing curve of the load acting on intermeshing teeth of said gears, which curve is on a side in which a relative sliding velocity at a surface of contact of said gears is higher, extends in a downwardly convex manner.

11. A gear device according to claim 8 wherein said corrected tooth profile obtained by a combination of said involute curve and said sixth correction curve is formed only for an addendum portion bordered by the pitch circle of said gears.

12. A gear device according to claim 8 wherein said corrected tooth profile obtained by a combination of said involute curve and said sixth correction curve is formed only for a dedendum portion bordered by the pitch circle of said gears.

13. A gear device according to claim 8 wherein each of said tooth profiles of said gears is corrected.

14. A method of producing a gear device, comprising:

providing a first gear and a second gear each having a tooth profile formed by an involute curve;

correcting at least one of said tooth profiles by a sixth correction curve, said sixth correction curve being obtained by correction curves comprising:

first and second tooth-profile correction curves calculated based on the following equation (3) having m determined by the following equation (1) and n determined by the following equation (2) on plane coordinates consisting of an x axis, an origin and a y axis which intersects with said x axis at said origin, said x axis being a line of action indicative of a locus along which an intermeshing point moves while said first gear transmits a force to said second gear, said origin disposed at a location at which said x axis intersects with an intermeshing pitch circle of said first and second gears, said equations (1) and (2) passing through points $P_1(x_1, y_1)$ and $P_2(x_2, y_2)$ and satisfying the conditions of: y=0, dy/dx=0 at said origin when $x_1<x_2$ and $y_1<y_2$, said first tooth-profile correction curve being employed whereby a product of a load due to the gear intermeshing and a relative sliding velocity immediately after a point at which a maximum load starts to decrease is smaller than a product of the relative sliding velocity and the maximum load at said point, said second tooth-profile correction curve being employed whereby a vibration caused by the gear intermeshing is minimized; said first and second correction curves being depicted on said plane coordinates;

a third tooth-profile correction curve indicative of a mean value between said first and second correction curves; and a fourth tooth-profile correction curve being depicted so that it externally contacts said first correction curve at a broadest spacing between said first and second correction curves, and a fifth tooth-profile correction curve being depicted so that it internally contacts said second correction curve, wherein at least a portion of each of said fourth and fifth correction curves is parallel with said third correction curve, said sixth correction curve being disposed between said fourth and fifth correction curves, and wherein said sixth correction curve comprises a sum of correction amounts of said each gears on said x axis; and wherein:

$$m = \frac{y_1}{x_1^n} = \frac{y_2}{x_2^n} \quad (1)$$

$$n = \frac{\log_e \frac{y_2}{y_1}}{\log_e \frac{x_2}{x_1}} \quad (2)$$

$$y = mx^n. \quad (3)$$

15. A method of producing a gear device, comprising:

providing a first gear and a second gear each having a tooth profile formed by an involute curve;

correcting at least one of said tooth profiles based on a correction amount obtained by a correction curve such that a combined correction amount of said first and second gears is equal to said correction amount obtained by said correction curve, said correction curve being expressed by the following equation (3) having m determined by the following equation (1) and n determined by the following equation (2) on plane coordinates consisting of an x axis, an origin and a y axis which intersects with said x axis at said origin, said x axis being the line of action indicative of a locus along which an intermeshing point moves while said first gear transmits a force to said second gear, said origin disposed at a location at which said x axis intersects with an intermeshing pitch circle of said first and second gears, said equations (1) and (2) passing through points $P_1(x_1, y_1)$ and $P_2(x_2, y_2)$ and satisfying the conditions of: y=0, dy/dx=0 at said origin when $x_1<x_2$ and $y_1<y_2$; and wherein:

$$m = \frac{y_1}{x_1^n} = \frac{y_2}{x_2^n} \quad (1)$$

$$n = \frac{\log_e \frac{y_2}{y_1}}{\log_e \frac{x_2}{x_1}} \quad (2)$$

$$y = mx^n. \quad (3)$$

16. A method of producing a gear device, comprising:

providing a first gear and a second gear each having a tooth profile formed by an involute curve;

correcting at least one of said tooth profiles based on a correction amount obtained by a correction curve such that a combined correction amount of said first and second gears is equal to said correction amount obtained by said correction curve, said correction curve being calculated based on the following equation (3) so that an increasing curve extends in an upwardly convex manner and a decreasing curve extends in a downwardly convex manner, said curves indicating a load acting on teeth of the intermeshing gears, said equation (3) having m determined by the following equation (1) and n determined by the following equation (2) on plane coordinates consisting of an x axis, an origin and a y axis which intersects with said x axis at said origin, said x axis being a line of action indicative of a locus along which an intermeshing point moves while said first gear transmits a force to said second gear, origin at which said x axis intersects with an intermeshing pitch circle of said first and second gears, said equations (1) and (2) passing through points $P_1(x_1, y_1)$ and $P_2(x_2, y_2)$ and satisfying the conditions of: y=0, dy/dx=0 at said origin when $x_1<x_2$ and $y_1<y_2$; and wherein:

$$m = \frac{y_1}{x_1^n} = \frac{y_2}{x_2^n} \quad (1)$$

$$n = \frac{\log_e \frac{y_2}{y_1}}{\log_e \frac{x_2}{x_1}} \quad (2)$$

$$y = mx^n. \quad (3)$$

17. A method of producing a gear device, comprising:

providing a first gear and a second gear each having a tooth profile formed by an involute curve;

correcting at least one of said tooth profiles based on a correction amount obtained by a correction curve such that a combined correction amount of said first and second gears is equal to said correction amount obtained by said correction curve, said correction curve being calculated based on the following equation (3) so that one of an increasing curve and a decreasing curve, which curve is adjacent to a higher degree of relative sliding velocity at the teeth surface of contact extends linearly, said curves indicating a load acting on intermeshing teeth of said gears, said equation (3) having m determined by the following equation (1) and n determined by the following equation (2) on plane coordinates consisting of an x axis, an origin and a y axis which intersects with said x axis at said origin, said x axis being a line of action indicative of a locus along which an intermeshing point moves while said first gear transmits a force to said second gear, said origin disposed at a location at which said x axis intersects with an intermeshing pitch circle of said first and second gears, said equations (1) and (2) passing through points $P_1(x_1, y_1)$ and $P_2(x_2, y_2)$ and satisfying the conditions of: y=0, dy/dx=0 at said origin when $x_1<x_2$ and $y_1<y_2$; and wherein:

$$m = \frac{y_1}{x_1^n} = \frac{y_2}{x_2^n} \quad (1)$$

$$n = \frac{\log_e \frac{y_2}{y_1}}{\log_e \frac{x_2}{x_1}} \quad (2)$$

$$y = mx^n. \quad (3)$$

18. A method of producing a gear device, comprising;

providing a first gear and a second gear each having a tooth profile formed by an involute curve;

correcting at least one of said tooth profiles based on a correction amount obtained by a correction curve such that a combined correction amount of said first and second gears is equal to said correction amount obtained by said correction curve, said correction curve being calculated based on the following equation (3) so that a product of a load acting on the gear intermeshing and a relative sliding velocity immediately after a point at which the maximum load starts to decrease is smaller than a product of the relative sliding velocity and the maximum load at said point, said equation (3) having m determined by the following equation (1) and n determined by the following equation (2) on plane coordinates consisting of an x axis, an origin and a y axis which intersects with said x axis at said origin, said x axis being a line of action indicative of a locus along which an intermeshing point moves while said first gear transmits a force to said second gear, said origin disposed at a location at which said x axis intersects with an intermeshing pitch circle of said first and second gears, said equations (1) and (2) passing through points $P_1(x_1, y_1)$ and $P_2(x_2, y_2)$ and satisfying the conditions of: $y=0$, $dy/dx=0$ at said origin when $x_1 < x_2$ and $y_1 < y_2$; and wherein:

$$m = \frac{y_1}{x_1^n} = \frac{y_2}{x_2^n} \tag{1}$$

$$n = \frac{\log_e \frac{y_2}{y_1}}{\log_e \frac{x_2}{x_1}} \tag{2}$$

$$y = mx^n. \tag{3}$$

* * * * *